(12) United States Patent
Kwon et al.

(10) Patent No.: US 9,608,314 B1
(45) Date of Patent: Mar. 28, 2017

(54) MOBILE TERMINAL

(71) Applicant: LG ELECTRONICS INC., Seoul (KR)

(72) Inventors: Youngbae Kwon, Seoul (KR); Kangjae Jung, Seoul (KR); Sungjung Rho, Seoul (KR); Changwon Yun, Seoul (KR); Duckyun Kim, Seoul (KR); Yunmo Kang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/240,715

(22) Filed: Aug. 18, 2016

(30) Foreign Application Priority Data

Jan. 11, 2016 (KR) .......................... 10-2016-0003386

(51) Int. Cl.
  *H01Q 1/24* (2006.01)
  *H01Q 13/10* (2006.01)
  *H01Q 5/307* (2015.01)

(52) U.S. Cl.
  CPC ............. *H01Q 1/243* (2013.01); *H01Q 1/242* (2013.01); *H01Q 5/307* (2015.01); *H01Q 13/106* (2013.01)

(58) Field of Classification Search
  CPC .......... H01Q 1/24; H01Q 1/242; H01Q 1/243; H01Q 5/307; H01Q 13/10
  See application file for complete search history.

(56) References Cited

U.S. PATENT DOCUMENTS

2011/0193752 A1* 8/2011 Wang ...................... H01Q 1/243
                                                  343/702
2016/0149290 A1* 5/2016 Park ....................... H01Q 1/243
                                                  343/702

FOREIGN PATENT DOCUMENTS

| JP | 2007-534188 A | 11/2007 |
| KR | 2000-0022038 A | 4/2000 |
| KR | 10-2006-0097498 A | 9/2006 |
| KR | 10-2012-0010922 A | 2/2012 |
| KR | 10-2014-0037687 A | 3/2014 |

* cited by examiner

*Primary Examiner* — Hoang V Nguyen
(74) *Attorney, Agent, or Firm* — Birch, Stewart, Kolasch & Birch, LLP

(57) ABSTRACT

The present invention relates to a mobile terminal, which includes a terminal body having a rear surface and side surfaces extending from each end portion of the rear surface toward a front surface, the terminal body made of a metal, a lower cap detachably coupled to a lower end of the terminal body and externally exposed to operate as a radiator of an antenna apparatus, a non-metal member interposed between the terminal body and the lower cap and forming a slot by spacing the terminal body and the lower cap apart from each other, and a dividing member crossing the non-metal member, and dividing an area where the terminal body and the lower cap are electrically connected and generate an electric field accordingly, the dividing member dividing the slot into first and second slots.

20 Claims, 14 Drawing Sheets

MOBILE TERMINAL

CROSS-REFERENCE TO RELATED APPLICATION

Pursuant to 35 U.S.C. §119(a), this application claims the benefit of an earlier filing date of and the right of priority to Korean Application No. 10-2016-0003386, filed on Jan. 11, 2016, the contents of which are incorporated by reference herein in its entirety.

BACKGROUND OF THE INVENTION

1. Field of the Invention

This specification relates to a mobile terminal using its case as an antenna.

2. Background of the Invention

Terminals may be divided into mobile/portable terminals and stationary terminals according to their mobility. Also, the mobile terminals may be classified into handheld terminals and vehicle mount terminals according to whether or not a user can directly carry.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

As it becomes multifunctional, a mobile terminal can be allowed to capture still images or moving images, play music or video files, play games, receive broadcast and the like, so as to be implemented as an integrated multimedia player.

Efforts are ongoing to support and increase the functionality of mobile terminals. Such efforts include software and hardware improvements, as well as changes and improvements in the structural components.

In recent time, a design of forming a rear surface of the mobile terminal using a metallic material is increasing in order to provide attractive appearance to the mobile terminal. However, the formation of a case of the terminal using such metallic material may cause a problem of lowering an antenna performance.

SUMMARY OF THE INVENTION

Therefore, an aspect of the detailed description is to obviate the aforementioned problem and other drawbacks of the related art.

Another aspect of the detailed description is to provide a mobile terminal having a rear case made of a metal and also using a lower end portion, which is formed with being spaced apart from a terminal body, as an antenna to avoid interference with an antenna performance.

To achieve these and other advantages and in accordance with the purpose of this specification, as embodied and broadly described herein, there is provided a mobile terminal, including a terminal body having a rear surface and side surfaces extending from each end portion of the rear surface toward a front surface, the terminal body made of a metal, a lower cap detachably coupled to a lower end of the terminal body and externally exposed to operate as a radiator of an antenna apparatus, a non-metal member interposed between the terminal body and the lower cap and forming a slot by spacing the terminal body and the lower cap apart from each other, and a dividing member crossing the non-metal member, and dividing an area where the terminal body and the lower cap are electrically connected and generate an electric field accordingly, the dividing member dividing the slot into first and second slots, wherein the antenna apparatus includes a first antenna generating an electric field by the first slot, the first slot having one side open and another side closed by the dividing member such that the first antenna resonates at a first frequency band, and a second antenna generating an electric field by the second slot, the second slot having one side open and another side closed by the dividing member such that the second antenna resonates at a second frequency band different from the first frequency band, and wherein the first and second antennas include feeders, respectively, connected to a main printed circuit board provided in the terminal body and generating the electric fields on the first and second slots, respectively, wherein the lower cap includes a first member exposed to the front surface of the mobile terminal, a second member exposed to the rear surface of the mobile terminal, and a connecting portion connecting end portions of the first and second members to each other, the second member and the connecting portion made of a metal.

In accordance with one aspect of the present invention, the first member may be made of a metal or a non-metal.

In accordance with one aspect of the present invention, the lower cap may implement a first state of being coupled to the terminal body, and a second state of being separated from the terminal body.

In accordance with one aspect of the present invention, the first member, when being made of the metal, may be electrically connected to the connecting portion via a clip member.

In accordance with one aspect of the present invention, the first and second antennas may include, respectively, first and second feeders provided on the main printed circuit board and connected to an inner side surface of the first member or the second member. Here, the first feeder may allow the electric field to be generated on the first slot, and the second feeder may allow the electric field to be generated on the second slot.

In accordance with one aspect of the present invention, at least one of the first and second feeders may be provided with a feeder extending portion disposed at an overlapped position by the non-metal member and adjusting a position for feeding the lower cap.

In accordance with one aspect of the present invention, the feeder extending portion may be located on the first slot or the second slot.

In accordance with one aspect of the present invention, the dividing member may be a metal strip with a predetermined width or a plurality of fine cables.

In accordance with one aspect of the present invention, the terminal body may be provided therein with an intermediate frame made of a metal, and an electric field may be generated between the intermediate frame and the lower cap.

In accordance with one aspect of the present invention, a length of the first slot extending from the dividing member to a first opening at the open side of the first slot may be ¼ of a wavelength ($\lambda$) corresponding to a center frequency of the first frequency band.

In accordance with one aspect of the present invention, a length of the second slot extending from the dividing member to a second opening at the open side of the second slot may be ¼ of a wavelength (λ) corresponding to a center frequency of the second frequency band.

In accordance with one aspect of the present invention, the mobile terminal may further include at least one switch having one side connected to the terminal body and another side connected to the lower cap.

In accordance with one aspect of the present invention, the mobile terminal may further include a first stub disposed on the first slot, and having one side connected to the lower cap and another side forming an open end, so as to vary a first resonance frequency of the first frequency band.

In accordance with one aspect of the present invention, the mobile terminal may further include a second stub disposed on the second slot, and having one side connected to the lower cap and another side forming an open end, so as to vary a second resonance frequency of the second frequency band.

In accordance with one aspect of the present invention, the lower cap may be provided with a sub printed circuit board, the sub printed circuit board may be provided with a connector, and the terminal body may be provided with a contact terminal connected to the main printed circuit board in the first state.

In accordance with one aspect of the present invention, the feeder extending portion, the dividing member and the connector may be separated from the terminal body together with the lower cap in the second state.

In accordance with one aspect of the present invention, the lower cap may be provided with a bracket inserted into the terminal body, and the bracket may accommodate therein the feeder extending portion, the dividing member and the connector.

A mobile terminal and a control method thereof will provide the following effects.

According to at least one of embodiments disclosed herein, a rear surface of the mobile terminal may be made of a metallic material, which can provide more attractive appearance to the mobile terminal and simultaneously allow the mobile terminal to be formed in a dividing manner such that a part of the mobile terminal can be used as an antenna.

According to at least one of embodiments disclosed herein, an antenna pattern may be disposed on an inner side surface of a divided part. This may result in ensuring stable antenna performance and reliability even in a detachable structure.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Figure 1A:
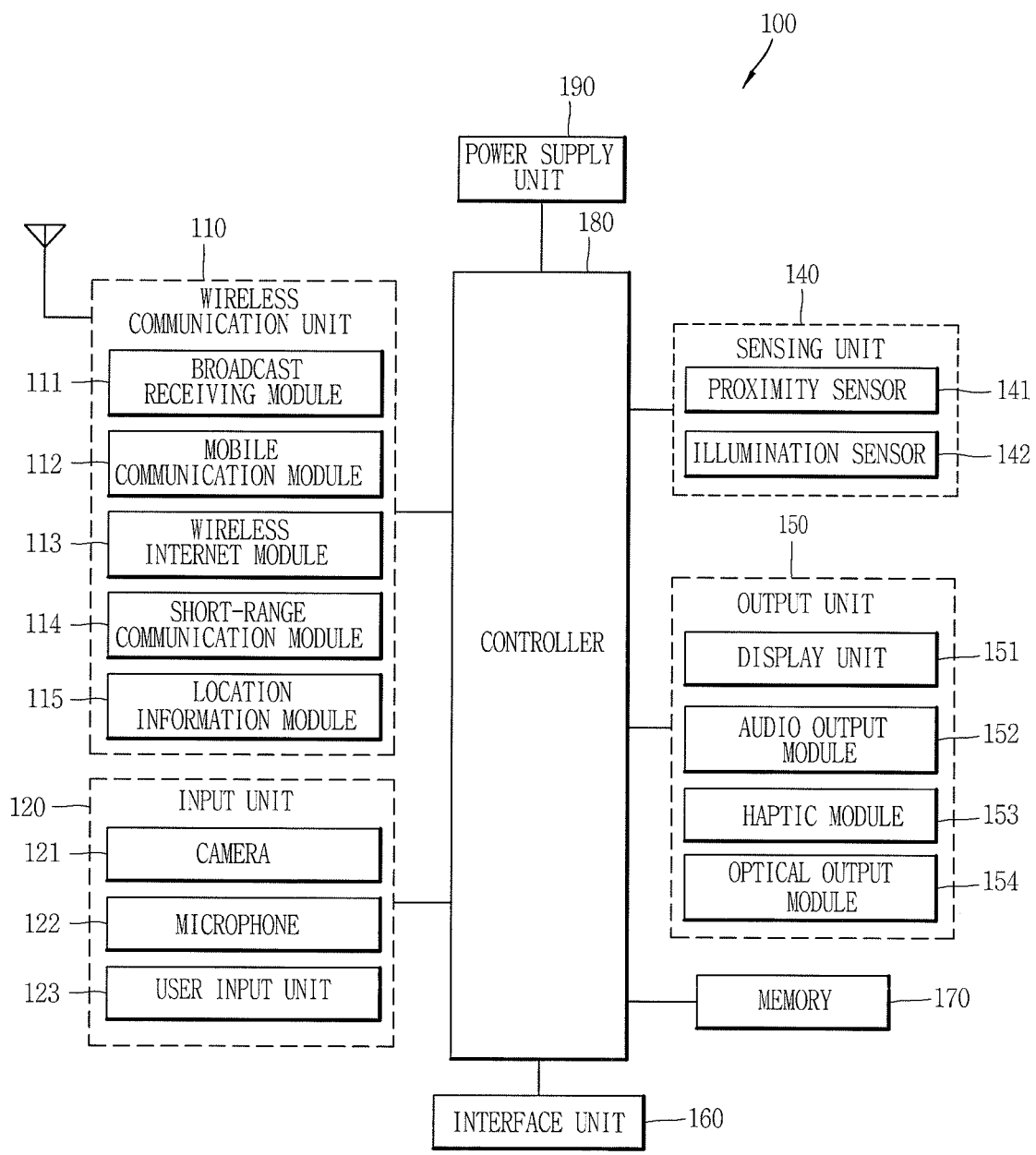
FIG. 1A is a block diagram of a mobile terminal in accordance with the present invention.

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present invention, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present invention should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, digital signage and the like.

Figure 1B:
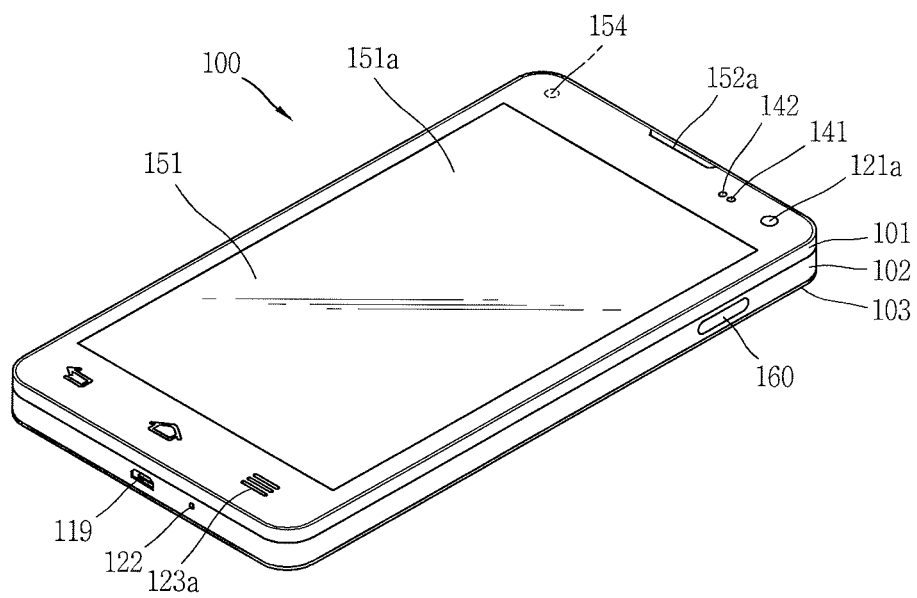
FIGS. 1B and 1C are conceptual views illustrating one example of a typical mobile terminal, viewed from different directions.
Figure 1C:
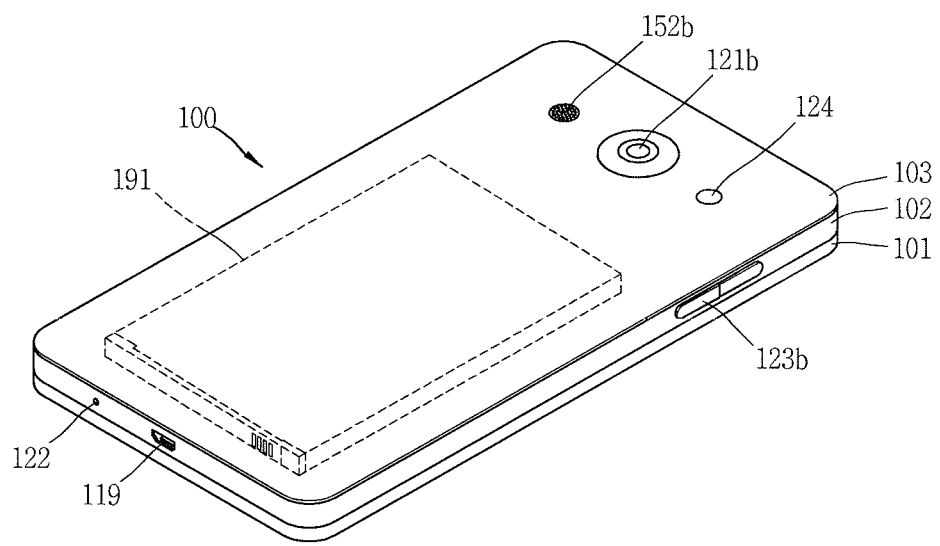

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

In more detail, the wireless communication unit 110 may typically include one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 may typically include one or more modules which connect the mobile terminal 100 to one or more networks.

The wireless communication unit 110 may include one or more of a broadcast receiving module 111, a mobile communication module 112, a wireless Internet module 113, a short-range communication module 114, and a location information module 115.

The input unit 120 may include a camera 121 or an image input unit for obtaining images or video, a microphone 122, which is one type of audio input device for inputting an audio signal, and a user input unit 123 (for example, a touch key, a mechanical key, and the like) for allowing a user to input information. Data (for example, audio, video, image, and the like) may be obtained by the input unit 120 and may be analyzed and processed according to user commands.

The sensing unit 140 may typically be implemented using one or more sensors configured to sense internal information of the mobile terminal, the surrounding environment of the mobile terminal, user information, and the like. For example, the sensing unit 140 may include at least one of a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like). The mobile terminal disclosed herein may be configured to utilize information obtained from one or more sensors of the sensing unit 140, and combinations thereof.

The output unit 150 may typically be configured to output various types of information, such as audio, video, tactile output, and the like. The output unit 150 may be shown having at least one of a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the aforementioned various components, or activating application programs stored in the memory 170.

Also, the controller 180 controls some or all of the components illustrated in FIG. 1A according to the execution of an application program that have been stored in the memory 170. In addition, the controller 180 may control at least two of those components included in the mobile terminal to activate the application program.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least part of the components may cooperatively operate to implement an operation, a control or a control method of a mobile terminal according to various embodiments disclosed herein. Also, the operation, the control or the control method of the mobile terminal may be implemented on the mobile terminal by an activation of at least one application program stored in the memory 170.

Hereinafter, description will be given in more detail of the aforementioned components with reference to FIG. 1A, prior to describing various embodiments implemented through the mobile terminal 100.

First, regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), Enhanced Voice-Date Optimized or Enhanced Voice-Data Only (EV-DO), Wideband CDMA (WCDMA), High Speed Downlink Packet access (HSDPA), High Speed Uplink Packet Access (HSUPA), Long Term Evolution (LTE), LTE-advanced (LTE-A) and the like).

Examples of the wireless signals include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), High Speed Uplink Packet Access (HSUPA), Long Term Evolution (LTE), LTE-advanced (LTE-A) and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LET-A, and the like, as part of a mobile communication network, the wireless Internet module 113 may be understood as a type of the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

Here, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of at least part of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position (or current position) of the mobile terminal. As an example, the location information module 115 includes a Global Position System (GPS) module, a Wi-Fi module, or both. For example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module. If desired, the location information module 115 may alternatively or additionally function with any of the other modules of the wireless communication unit 110 to obtain data related to the position of the mobile terminal. The location information module 115 is a module used for acquiring the position (or the current position) and may not be limited to a module for directly calculating or acquiring the position of the mobile terminal.

The input unit 120 may be configured to permit various types of inputs to the mobile terminal 100. Examples of such inputs include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. Meanwhile, the cameras 121 may be arranged in a matrix configuration to permit a plurality of images having various angles or focal points to be input to the mobile terminal 100. Also, the cameras 121 may be located in a stereoscopic arrangement to acquire left and right images for implementing a stereoscopic image.

The microphone 122 processes an external audio signal into electric audio (sound) data. The processed audio data can be processed in various manners according to a function being executed in the mobile terminal 100. If desired, the microphone 122 may include assorted noise removing algorithms to remove unwanted noise generated in the course of receiving the external audio signal.

The user input unit 123 is a component that permits input by a user. Such user input may enable the controller 180 to control operation of the mobile terminal 100. The user input unit 123 may include one or more of a mechanical input element (for example, a mechanical key, a button located on a front and/or rear surface or a side surface of the mobile terminal 100, a dome switch, a jog wheel, a jog switch, and the like), or a touch-sensitive input element, among others. As one example, the touch-sensitive input element may be a virtual key, a soft key or a visual key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like, and generate a corresponding sensing signal. The controller 180 generally cooperates with the sending unit 140 to control operation of the mobile terminal 100 or execute data processing, a function or an operation associated with an application program installed in the mobile terminal based on the sensing signal. The sensing unit 140 may be implemented using any of a variety of sensors, some of which will now be described in more detail.

The proximity sensor 141 refers to a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like). In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data (or information) according to whether a touch with respect to a point on the touch screen is either a proximity touch or a contact touch.

A touch sensor can sense a touch (or a touch input) applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched region, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

Meanwhile, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the mobile terminal. The photo sensor may be configured to scan movement of the physical object in proximity to the touch screen. In more detail, the photo sensor may include photo diodes and transistors (TR) at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the flexible display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule alarm, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a flash memory type, a hard disk type, a solid state disk (SSD) type, a silicon disk drive (SDD) type, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control an operation associated with an application program and the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type the body of the portable electronic device. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. However, such teachings with regard to a particular type of portable electronic device will generally apply to other types of mobile terminals as well.

The body of the mobile terminal may be understood to indicate the mobile terminal 100 by regarding the mobile terminal 100 as at least one assembly.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may include a display unit 151, first and second audio output module 152a and 152b, a proximity sensor 141, an illumination sensor 142, an optical output module 154, first and second cameras 121a and 121b, first and second manipulation units 123a and 123b, a microphone 122, an interface unit 160, and the like.

Hereinafter, as illustrated in FIGS. 1B and 1C, description will be given of the exemplary mobile terminal 100 in which the front surface of the terminal body is shown having the display unit 151, the first audio output module 152a, the proximity sensor 141, the illumination sensor 142, the optical output module 154, the first camera 121a, and the first manipulation unit 123a, the side surface of the terminal body is shown having the second manipulation unit 123b, the microphone 122, and the interface unit 160, and the rear surface of the terminal body is shown having the second audio output module 152b and the second camera 121b.

However, those components may not be limited to the arrangement. Some components may be omitted or rearranged or located on different surfaces. For example, the first manipulation unit 123a may be located on another surface of the terminal body, and the second audio output module 152b may be located on the side surface of the terminal body other than the rear surface of the terminal body.

The display unit 151 outputs information processed in the mobile terminal 100. For example, the display unit 151 may display execution screen information of an application program executing at the mobile terminal 100 or user interface (UI) and graphic user interface (GUI) information in response to the execution screen information.

The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a receiver for transferring call sounds to a user's ear and the second audio output module 152b may be implemented in the form of a loud speaker to output alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule alarm, an email reception, information reception through an application, and the like. When a user has checked a generated event, the controller 180 can control the optical output module 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

When the rear input unit is provided at the rear surface of the terminal body, a new type of user interface using this may be implemented. Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

A flash 124 is shown adjacent to the second camera 121b. When an image of a subject is captured with the camera 121b, the flash 124 may illuminate the subject.

The second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body.

The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Figure 1D:
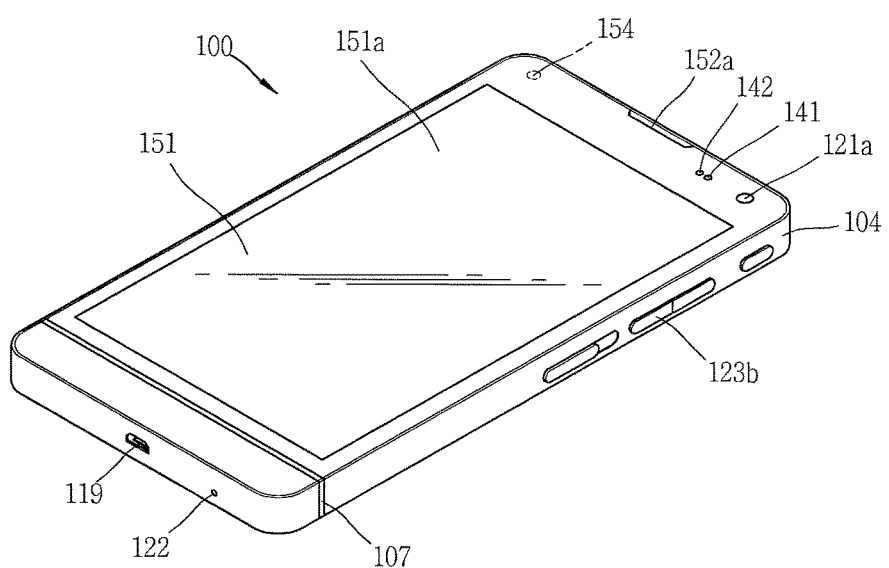
FIGS. 1D and 1E are conceptual views illustrating one example of a mobile terminal according to the present invention, viewed from different directions.
Figure 1E:
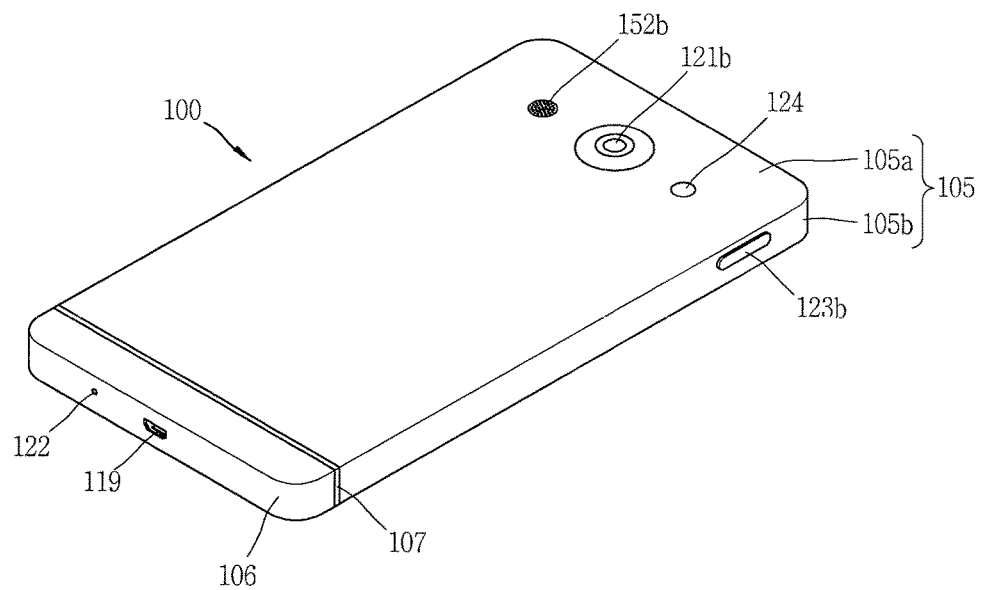
Figure 2:
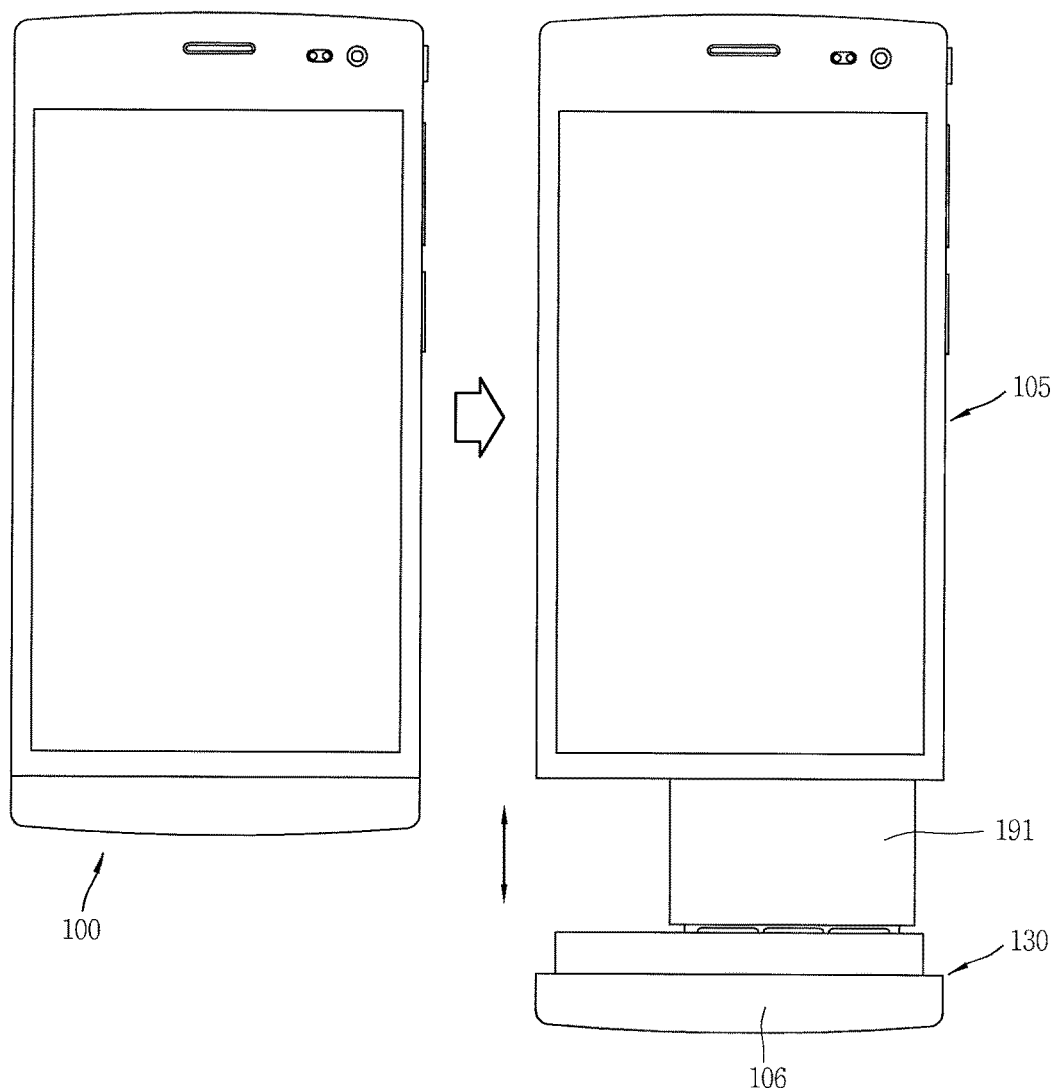
FIG. 2 is a view illustrating an exemplary use of a mobile terminal in accordance with one exemplary embodiment of the present invention.

FIGS. 1D and 1E are conceptual views illustrating one example of a mobile terminal according to the present invention, viewed from different directions, and FIG. 2 is a view illustrating an antenna in accordance with one exemplary embodiment of the present invention.

Hereinafter, a mobile terminal having an antenna in accordance with one exemplary embodiment of the present invention will be described with reference to FIGS. 1D, 1E and 2.

As illustrated in FIGS. 1D and 1E, a case of the mobile terminal according to the one embodiment disclosed herein exemplarily has a uni-body. However, the present invention may not be necessarily limited to this. The case according to the one embodiment may alternatively define appearance of the mobile terminal by including, as illustrated in FIGS. 1B and 1C, the front case 101, the rear case 102 and the rear cover 103.

Hereinafter, a uni-body type terminal will be described. However, the present invention may not be necessarily limited to this but be applicable even to the terminal illustrated in FIGS. 1B and 1C, unless otherwise specified.

In the one embodiment disclosed herein, a lower cap (or a metal cap) 106 may be inserted into or drawn out of a terminal body 105 in order to replace a battery 191 supplying power to the mobile terminal. That is, as illustrated in FIG. 2, a mobile terminal 100 according to the one embodiment disclosed herein may have a structure in which the lower cap 106 accommodating the battery 191 therein is inserted into a lower end of the mobile terminal 100 or drawn out of the lower end of the mobile terminal 100.

The mobile terminal according to the one embodiment disclosed herein may include a display unit 151 having a window 151a, a terminal body 105 on which the display unit 151 is mounted in a manner of forming an inner space with the terminal body 105, and a lower cap 106 selectively connected with the battery 191. The lower cap 191 may implement a first state in which the lower cap 106 is inserted into the inner space through the lower end of the terminal body 105, and a second state in which the lower cap 106 is drawn out of the inner space. Various electronic components may be disposed within the inner space. An intermediate frame 185 made of a metal for providing rigidity may also be provided.

Also, in one embodiment disclosed herein, the display unit 151 disposed toward a front surface of the mobile terminal 100 and the terminal body 105 which forms the inner space with covering a rear surface of the display unit 151 may define the appearance of the mobile terminal 100, and the lower cap 106 may define appearance of the lower end of the mobile terminal 100.

The second state refers to a state that the battery 191 is detached from the terminal body 105. When the battery 191 is separated, the mobile terminal is powered off.

Meanwhile, an antenna apparatus 130 may be disposed in an upper end or a lower end of the mobile terminal. The antenna apparatus 130 may be provided in plurality so as to be disposed at each end portion of the terminal. Antennas 131 and 136 may transmit and receive wireless signals of different frequency bands, respectively.

Also, the mobile terminal 100 according to the one embodiment disclosed herein may include the intermediate frame 185 made of a metal. The intermediate frame 185 may be made of a metallic material so as to have sufficient rigidity even though it is formed thin in thickness. That is, the intermediate frame 185 may operate as a ground. That is, a main printed circuit board 181 or the antenna apparatus 130 may be connected to the intermediate frame 185 in an earthing manner. The intermediate frame 185 may operate as a ground of the main printed circuit board 181 or the antenna apparatus 130. In this instance, the intermediate frame 185 may extend the ground of the mobile terminal 100. Therefore, the ground described herein refers to at least one of the intermediate frame 185 and the main printed circuit board 181.

The main printed circuit board 181 may be electrically connected to the antenna apparatus 130 and process wireless signals (or wireless electromagnetic waves) transmitted and received through the antenna apparatus. For processing such wireless signals, a plurality of transmitting and receiving circuits may be formed or mounted on the main printed circuit board 181.

The transmitting and receiving circuits may include at least one integrated circuit and related electric elements. For example, the transmitting and receiving circuits may include a transmitting integrated circuit, a receiving integrated circuit, a switching circuit, an amplifier and the like.

The plurality of transmitting and receiving circuits may simultaneously feed power to conductive members as radiators and accordingly the plurality of antenna apparatuses 130 can simultaneously operate. For example, while one of the plurality of antenna apparatuses 130 performs signal transmission, another one may perform signal reception, or both may perform signal transmission or reception.

Figure 3:
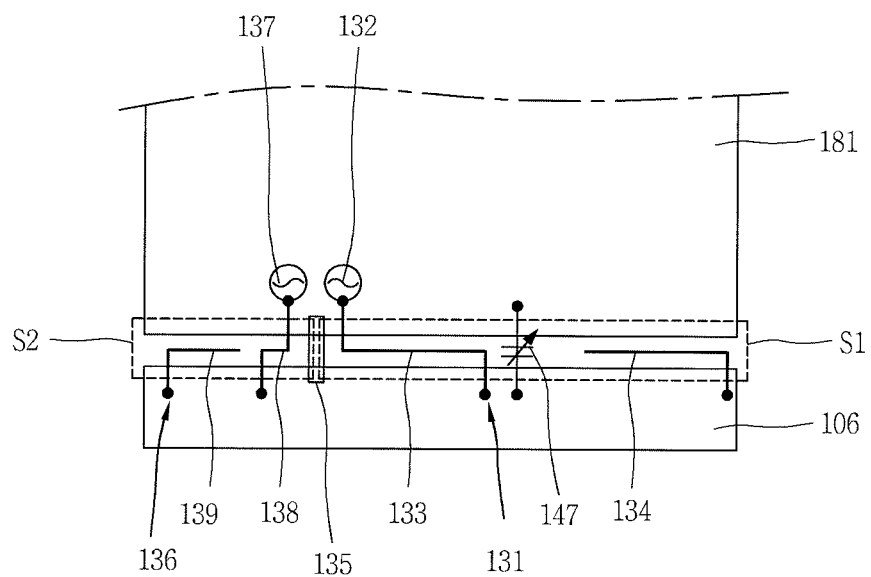
FIG. 3 is a schematic view of an antenna provided in a mobile terminal in accordance with one exemplary embodiment of the present invention.
Figure 4:
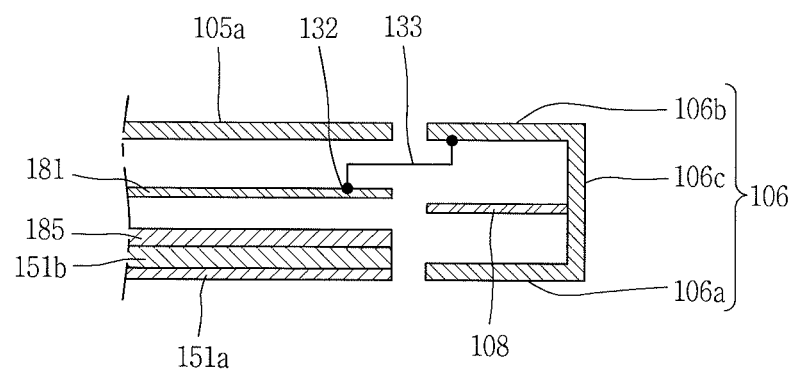
FIG. 4 is a partial sectional view taken along a thickness direction of a mobile terminal in accordance with one exemplary embodiment of the present invention.
Figure 5A:
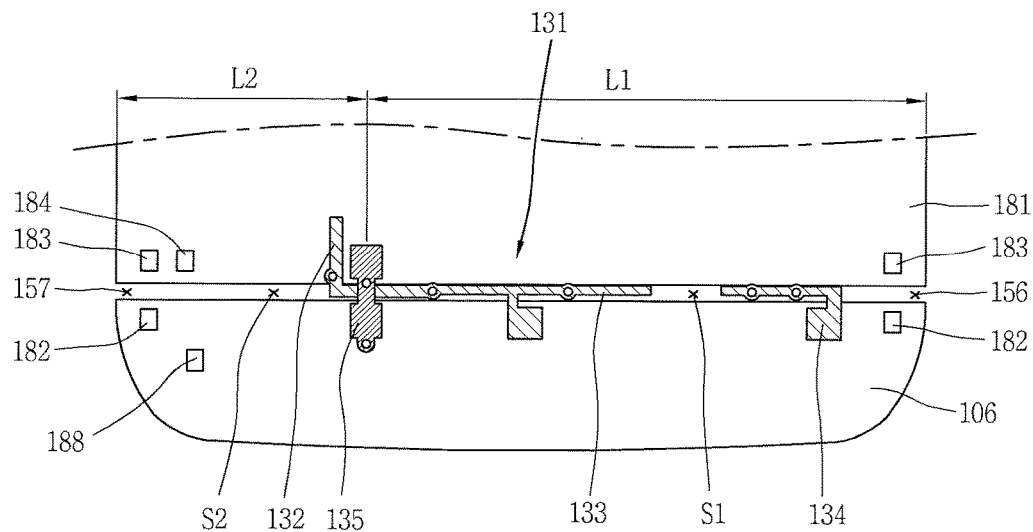
FIGS. 5A and 5B are schematic views illustrating an antenna provided in a mobile terminal in accordance with one exemplary embodiment of the present invention.
Figure 5B:
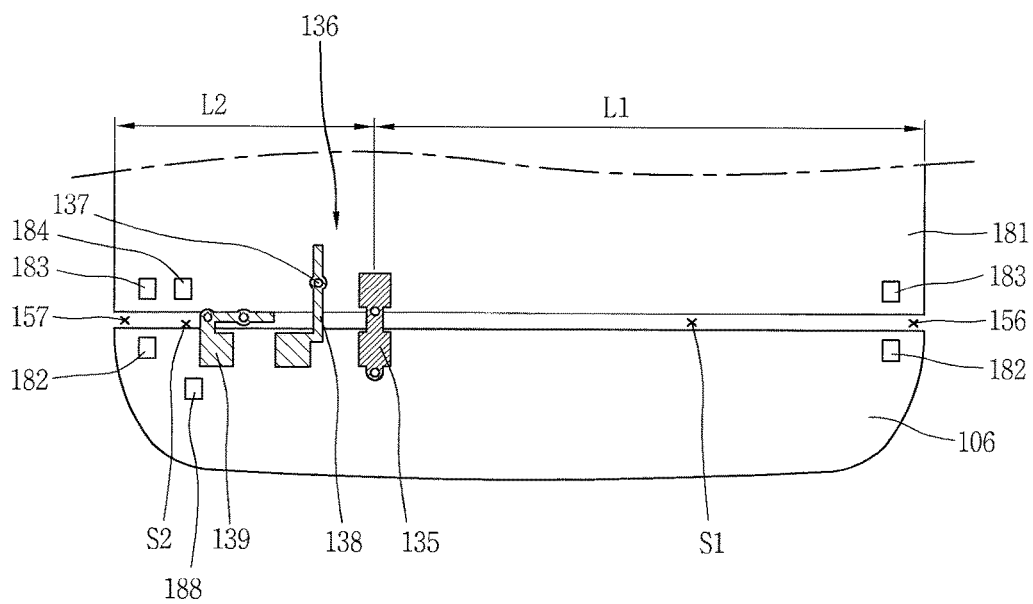

FIG. 3 is a conceptual view illustrating the antenna apparatus 130 in accordance with the one embodiment disclosed herein, FIG. 4 is a partial sectional view taken along the thickness direction of the mobile terminal in accordance with the one embodiment disclosed herein, and FIGS. 5A and 5B are schematic views illustrating the antenna provided in the mobile terminal 100 in accordance with the one embodiment disclosed herein.

Hereinafter, the antenna apparatus 130 provided in the mobile terminal 100 according to the one embodiment disclosed herein will be described with reference to FIGS. 3 to 5B.

As aforementioned, the mobile terminal according to the one embodiment disclosed herein may include the terminal body 105 having the display unit 151 and the main printed circuit board 181, and the lower cap (metal cap) 106 detachably coupled to the lower end of the terminal body 105. The terminal body 105 and the lower cap 106 may be spaced apart from each other by a non-metal member 107. The terminal body 105 may include a rear cover 105a covering the display unit 151, and side surfaces 105b formed toward the front surface from the rear cover 105a.

The terminal body 105 may be made of a metallic material, and the lower cap 106 may have at least part formed of a metal. Accordingly, the non-metal member 107, for example, a plastic member may be interposed between the terminal body 105 and the lower cap 106 for an electric insulation therebetween. This is similar to forming a slot, from the perspective of the antenna apparatus 130. That is, the non-metal member 107 may form a slot by spacing the terminal body 105 and the lower cap 106 apart from each other. The slot corresponds to an area formed by the spaced gap between the terminal body 105 and the lower cap 106.

The mobile terminal 100 may include therein the antenna apparatus 130 through which wireless signals are transmitted and received. The antenna apparatus 130 may include feeders 132 and 137 connected to the main printed circuit board 181 and generating (forming) an electric field at a slot S1, S2 or a surrounding of the slot S1, S2.

The antenna apparatus 130 may include a plurality of antennas, for example, two antennas. Hereinafter, a first antenna 131 and a second antenna 136 will separately be described.

The first and second antennas 131 and 136 are formed adjacent to each other. To electrically divide them, a dividing member 135 is disposed therebetween in the one embodiment disclosed herein. The dividing member 135 may go cross the non-metal member 107. Here, an electric field is generated between the terminal body 105 and the lower cap 106. In the one embodiment of the present invention, the dividing member 135 divides an area at which the electric field is generated by the terminal body 105 and the lower cap 106 electrically connected to each other, and also divides the slot S1, S2 into first and second slots S1 and S2. Accordingly, different antennas can be implemented on the basis of the dividing member 135. That is, the electric field is generated at the surroundings of the slots S1 and S2 and the dividing member 135 divides the electric field.

As such, in the one embodiment disclosed herein, the generation area of the electric field can be divided by the dividing member 135, and accordingly, the different antennas 131 and 136 can be implemented. In this instance, the dividing member 135 may serve as a function portion, and be made by using a metal strip having a predetermined area or a plurality of fine cables. The dividing member 135 performs a function of earthing a device, and thus operates as an earthing portion at the first and second antennas 131 and 136 in the one embodiment of the present invention. When the dividing member 135 is implemented by using the fine cables, the earthing function may be more improved as the number of fine cables increases.

The dividing member 135 is not externally exposed and located within the space formed by the terminal body 105 and the lower cap 106 in the first state. For example, the dividing member 135 may connect the rear cover 103 and the lower cap 106 to each other. As another example, one side of the dividing member 135 may be formed on the main printed circuit board 181 and another side thereof may be connected to a sub printed circuit board 108. Alternatively, one side of the dividing member 135 may be connected to the sub printed circuit board 108 and another side thereof may be connected to the rear cover 103. That is, the terminal body 105, the intermediate frame 185 and the main printed circuit board 181 may be electrically connected together in an upper side of the terminal, and the lower cap 106 and the sub printed circuit board 108 may be electrically connected to each other at a lower side of the terminal in the one embodiment disclosed herein. Therefore, any configuration may be employed if random components constructing the upper and lower sides of the terminal are merely connected, respectively, by the dividing member 135.

In the one embodiment disclosed herein, the dividing member 135 may allow the first and second antennas 131 and 136 to implement different frequency bands without interference with each other. In this instance, the first antenna 131 includes a first slot S1 having one side with an opening 156 and another side closed by the dividing member 135 such that the first antenna 131 can resonate at a first frequency band. The second antenna 136 includes a second slot S2 having one side with an opening 157 and another side closed by the dividing member 135 such that the second antenna 136 can resonate at a second frequency band which is different from the first frequency band. That is, the first and second slots S1 and S2 may have the first and second openings 156 and 157, respectively, to be open at each one side thereof.

In this instance, the lower cap 106 may be detachable from the terminal body 105, and can implement the first state in which the lower cap 106 is coupled to the terminal body 105, and the second state in which the lower cap 106 is separated from the terminal body 105. In the second state, the first and second antennas 131 and 136 do not operate.

Meanwhile, the lower cap 106 may be provided with first magnetic members 182, and the terminal body 105 may be provided with second magnetic members 183 at positions corresponding to the first magnetic members 182, respectively, such that the lower cap 106 can completely be coupled to the terminal body 105. The second magnetic member 183 may, of course, be replaced with other members. The first and second magnetic members 183 may be provided as a pair at each of both sides.

In this instance, a hall sensor 184 may be provided in the terminal body 105 to sense a change of a magnetic force of the first magnetic member 182.

The lower cap 106 has a cross section in a shape similar to '⊏' or 'C'. The lower cap 106 includes a first member 106a exposed to the front surface of the terminal body, a second member 106b exposed to the rear surface of the terminal body, and a connecting portion 106c connecting end portions of the first and second members 106a and 106b. In this manner, the lower cap 106 has a shape like a cap, and at least part thereof is formed of a metal. Therefore, the lower cap 106 can operate as a radiator of the first and second antennas 131 and 136.

In the one embodiment disclosed herein, the lower cap 106 including the first member 106a may fully be formed of a metal. Alternatively, the second member 106b and the connecting portion 106c may be formed of a metal and the first member 106a may be formed of a non-metal.

The first and second antennas 131 and 136, for example, may be slot antennas. The first antenna 131 includes a first feeder 132 formed on the main printed circuit board 181 provided within the terminal body 105 and connected to an inner side surface of the first member 106a. The electric field is formed on the first slot S1 by the first feeder 132. The second antenna 136 includes a second feeder 137 formed on the main printed circuit board 181 provided within the terminal body 105 and connected to an inner side surface of the first member 106a. The electric field is formed on the second slot S2 by the second feeder 137.

That is, the first antenna 131 generates the electric field on the slot S1, the second antenna 136 generates the electric field on the second slot S2, and the first and second slots S1 and S2 may be divided by the dividing member 135.

Figure 11:
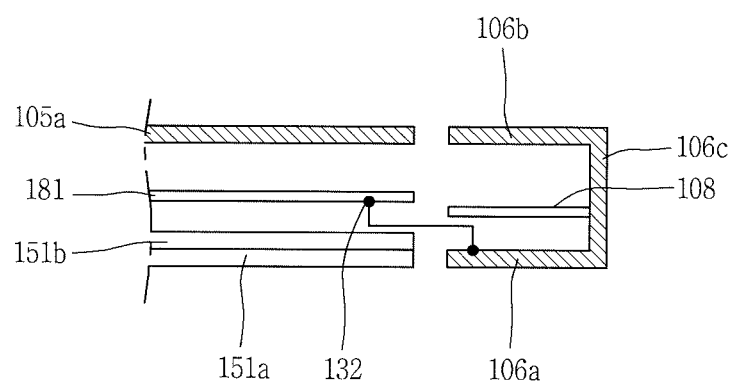
FIG. 11 is a view illustrating an antenna provided in a mobile terminal in accordance with one exemplary embodiment of the present invention.

However, in one embodiment disclosed herein, as illustrated in FIG. 11, the first and second feeders 132 and 137 may alternatively be connected to an inner side surface of the second member 106b.

In the one embodiment disclosed herein, the lower cap 106 is used as the radiator. Since the lower cap 106 defines the appearance of the terminal in a fixed form, the structure may make in difficult to allow impedance matching. In the one embodiment disclosed herein, feeder extending portions 133 and 138 which operate as additional radiators for allowing the impedance matching and ensuring frequency bands at the first and second antennas 131 and 136 may further be provided. For example, the first feeder extending portion 133 may be formed at the first feeder 132, and the second feeder extending portion 138 may be formed at the second feeder 137. In this instance, the feeder extending portions 133 and 138 are preferably disposed at the first slot S1 and the second slot S2, respectively. That is, the feeder extending portions 133 and 138 are preferably disposed on an inner side surface of the non-metal member 107 interposed between the terminal body 105 and the lower cap 106 so as to be located at a position overlapped by the non-metal member 107. However, the present invention may not be limited to this.

Also, the intermediate frame 185 made of the metal may be formed within the terminal body 105. An electric field may be formed between the intermediate frame 185 and the first member 106a, which may result in improving radiating performance of the first and second antennas 131 and 136.

Figure 9A:
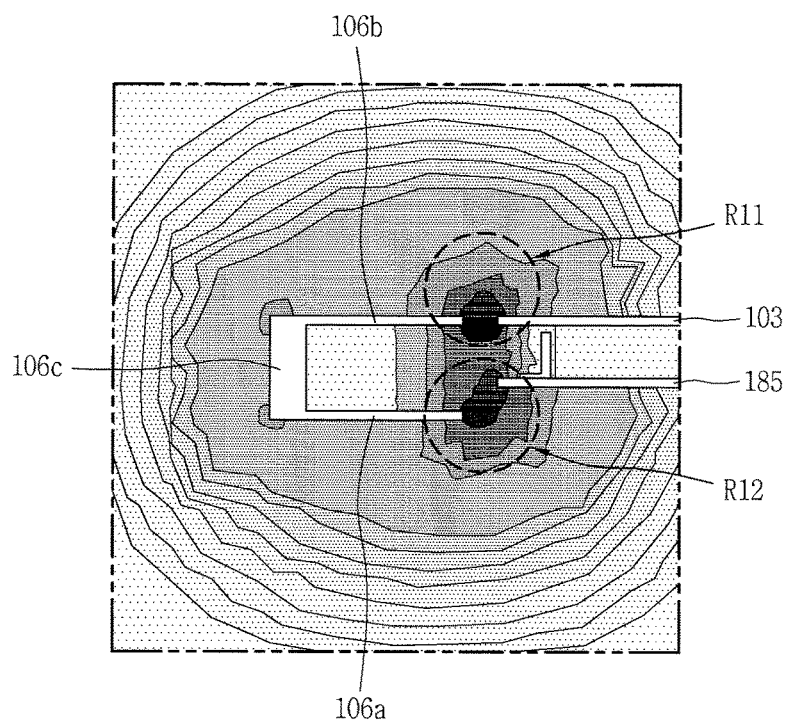
FIGS. 9A and 9C are views illustrating a distribution of an electric field by a first antenna in accordance with one exemplary embodiment of the present invention.
Figure 9B:
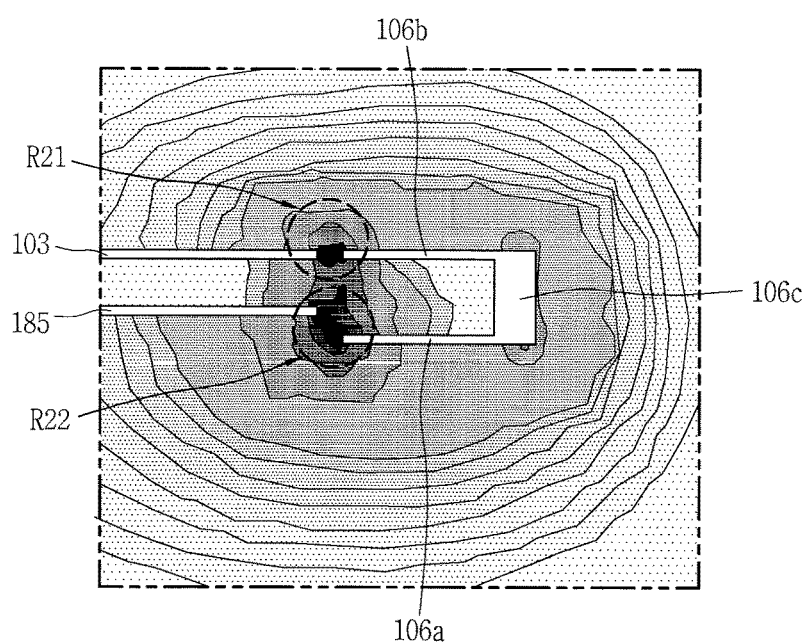
FIGS. 9B and 9D are views illustrating a distribution of an electric field by a second antenna in accordance with one exemplary embodiment of the present invention.

FIG. 9A illustrates a distribution of the electric field by the first antenna 131 in accordance with the one embodiment disclosed herein, and FIG. 9B illustrates a distribution of the electric field by the second antenna 136 in accordance with the one embodiment disclosed herein. As illustrated in FIGS. 9A and 9B, the electric fields can be uniformly formed on the front and rear surfaces of the terminal body by the first and second antennas 131 and 136, thereby improving the radiating performance.

In this instance, FIGS. 9A and 9B illustrate a case where the entire lower cap 106 is made of a metal.

That is, in the distribution of the electric field according to the one embodiment, two slot modes are generated, namely, a first slot mode R11 is generated between the rear cover 103 of the terminal body 105 and the second member 106b of the lower cap 106, and a second slot mode R12 is generated between the intermediate frame 185 and the first member 106a of the lower cap 106. In this instance, the first slot mode R11 gives rise to the radiation toward the rear surface of the terminal and the second slot mode R12 also gives rise to the radiation toward the front surface of the terminal, which can improve the radiation performance, thereby enhancing antenna efficiency. Even in this instance, the electric fields are also generated between the first member 106a and the rear cover 103 and between the second member 106b and the intermediate frame 185. However, those electric fields are inappreciable as compared to the electric fields formed in the first and second slot modes R11 and R12, and thus do not have to be considered.

However, if the first member 106a is a non-metal member, the electric field generated between the second part 106b and the intermediate frame 185 may also influence on the radiation performance of the antennas, together with the electric field generated in the first slot mode R11. In this instance, the rear cover 103 and the intermediate frame 185 are electrically connected to each other.

If the intermediate frame 185 is not provided, the electric field cannot be generated between the intermediate frame 185 and the lower cap 106, and thereby the electric field is merely generated between the rear cover 103 of the terminal body 105 and the lower cap 106, which may result in lowering the radiation performance. FIGS. 9A and 9B illustrate the distribution of the electric fields by the first and second antennas 131 and 136 in the thickness direction of the mobile terminal 100.

Figure 9C:
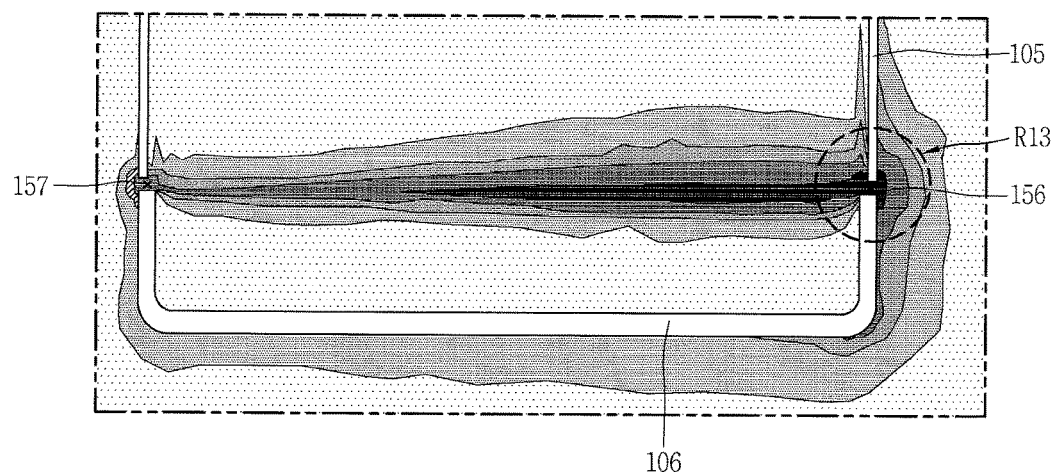
Figure 9D:
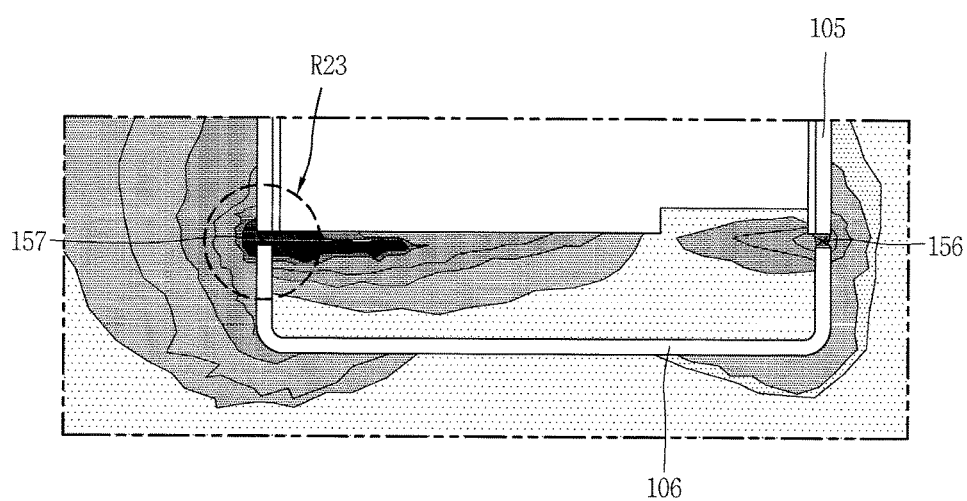

On the other hand, FIGS. 9C and 9D illustrate the distribution of the electric fields generated by the first antenna 131 and the second antenna 136, viewed from the front surface of the terminal body 100 according to the one embodiment disclosed herein. As illustrated in FIGS. 9C and 9D, since the first and second antennas 131 and 136 are the slot antennas, an electric field with high strength is generated at an area where the first and second openings 156 and 157 are formed. The first and second openings 156 and 157 may be referred to as open slots.

Meanwhile, in a general slot antenna, a slot is formed on a wall surface of a waveguide, a surface of a cylindrical conductor or a planar waveguide and power is fed to the slot-formed portion to generate an electric field in the slot. Accordingly, the slot antenna operates as a radiator of electric waves.

A slot antenna with one side open may resonate at a low frequency band, by virtue of a mirror effect, with a slot which is shorter in length than that of a slot antenna with both sides closed. That is, the slot antenna with the one side open may resonate at the same frequency band with a slot length which is approximately ½ of a length of the slot of the slot antenna with the both sides closed.

For the slot antenna with the both sides closed, in order to radiate electric waves of a first frequency band, the slot has a length which is ½ of a wavelength (λ) corresponding to a center frequency of the first frequency band. On the other hand, for the slot antenna with the one side open, the slot has a length which is ¼ of a wavelength (λ) corresponding to the center frequency. In other words, the slot antenna with the one side open can radiate electric waves corresponding to wireless signals of a low frequency band by using the shorter slot. This may allow a reduction of a size of the antenna.

Therefore, in the one embodiment disclosed herein, a length L1 of the first slot S1 that extends from the dividing member 135 to the first opening 156 of the first slot S1 is ¼ of a wavelength (λ) corresponding to a center frequency of the first frequency band, and a length L2 of the second slot S2 that extends from the diving member 135 to the second opening 157 of the second slot S2 is ¼ of a wavelength (λ) corresponding to a center frequency of the second frequency band.

Meanwhile, in the one embodiment disclosed herein, at least one switch 147 which has one side connected to the terminal body 105 and another side connected to the lower cap 106 may further be provided. The switch 147 may be a variable switch.

In the one embodiment disclosed herein, for the same reason as the feeder extending portions 133 and 138, first and second stubs 134 and 139 are employed. Hereinafter, description will be given based on the switch 147, but the switch 147 can be understood as having the same structure as the feeder extending portions 133 and 138 in terms of being employed to vary the first and second frequency bands.

The switch 147 may include a serial element which is implemented by including a capacitor or an inductor for impedance matching. The serial element may adjust a reactance value which is an imaginary number part of an impedance. As one example, the inductor increases reactance and the capacitor reduces the reactance, thereby enabling tuning for the impedance matching. The serial element may be implemented by including concentrated integer elements at portions of the first and second antennas 131 and 136. For example, a serial capacitor or a serial inductor may be disposed between the terminal body 105 and the lower cap 106. In this manner, when the capacitor is disposed, a lower frequency band is implemented. On the other hand, when the inductor is disposed, a higher frequency band is implemented.

When a shunt element or the serial element is included in the antenna apparatus 130, the antenna apparatus 130 can be more improved by changing a length or shape of a slot.

In addition, in the one embodiment disclosed herein, stubs 134 and 139 which manage major radiation along with the first and second slots S1 and S2 may further be provided. That is, the first stub 134 is disposed at the first slot S1 and have one side connected to an inner side surface of the lower cap 106 and another side forming an open end to implement a first resonance frequency of the first frequency band. In addition, the second stub 139 is disposed at the second slot S2 and have one side connected to the inner side surface of the lower cap 106 and another side forming an open end to implement a second resonance frequency of the second frequency band.

The first and second stubs 134 and 139 control the first and second frequency bands, respectively, and perform a function of improving performance of the first and second antennas 131 and 136.

Figure 6:
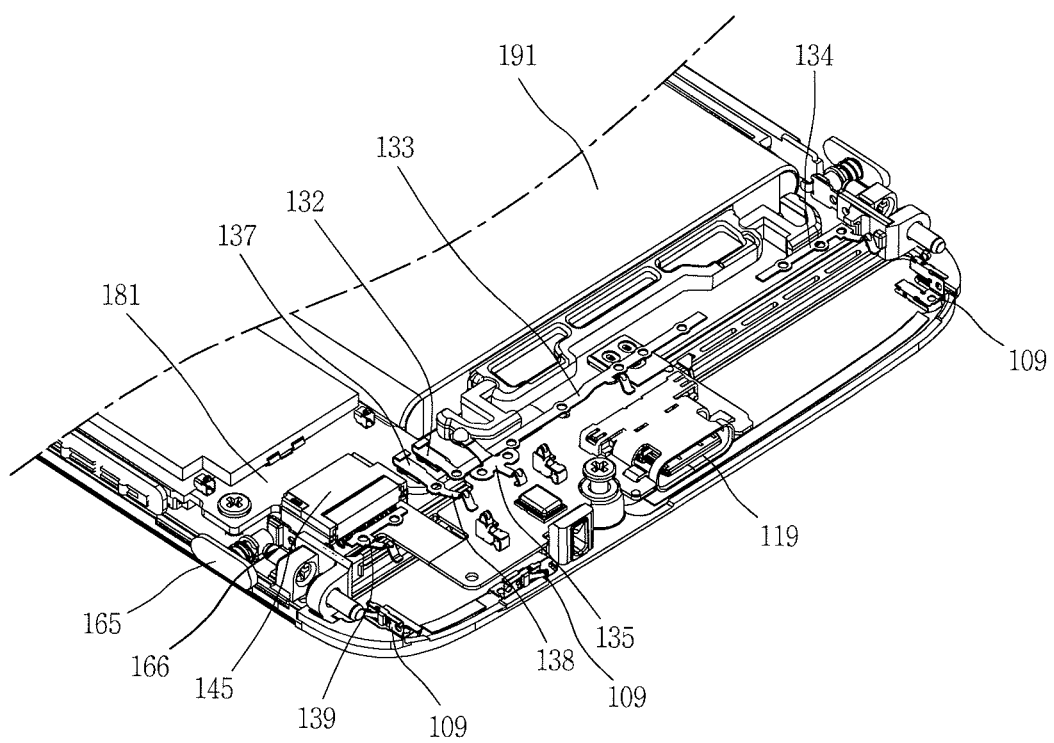
FIG. 6 is a rear perspective view of a mobile terminal in a case-removed state in accordance with one exemplary embodiment of the present invention.
Figure 7:
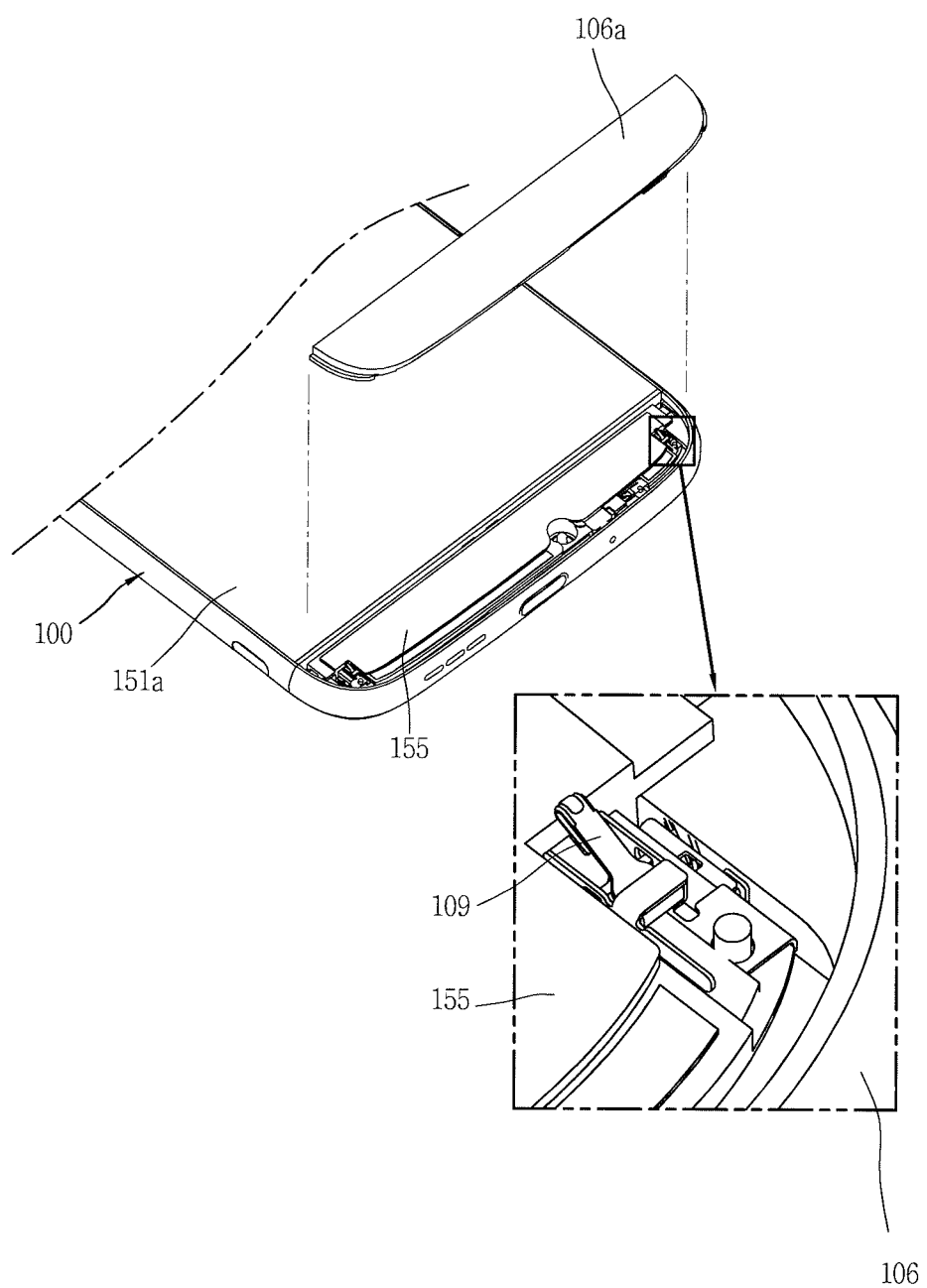
FIG. 7 is a front perspective view of a mobile terminal in a separated state of a first member in accordance with one exemplary embodiment of the present invention.
Figure 8:
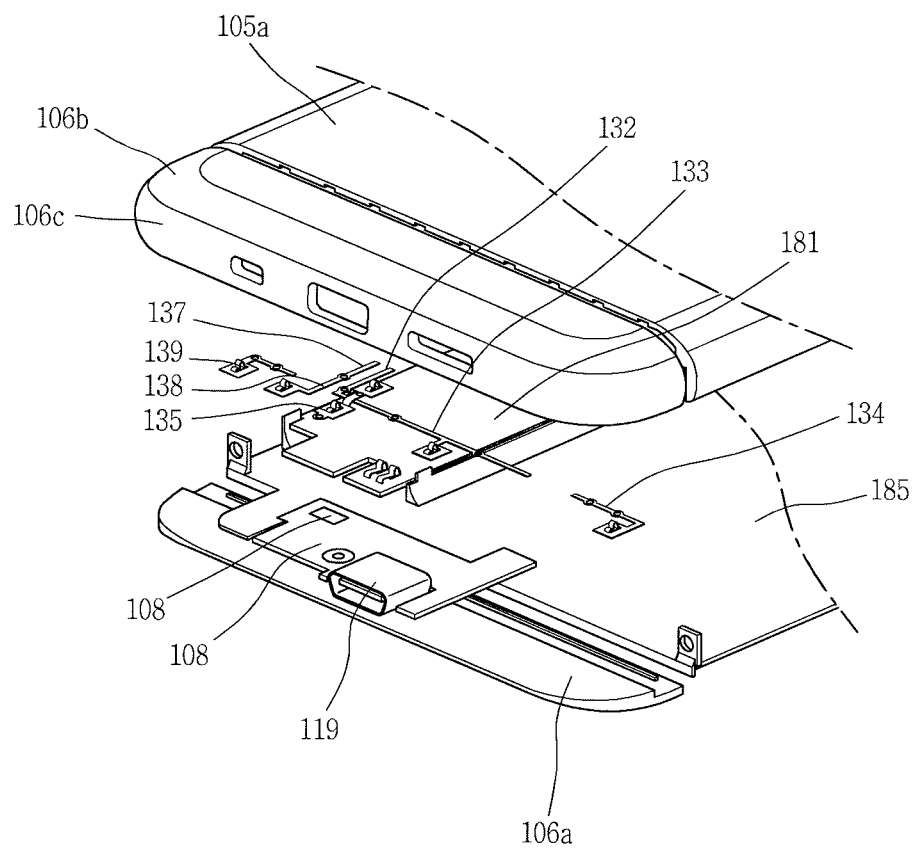
FIG. 8 is a disassembled perspective view of a mobile terminal in accordance with one exemplary embodiment of the present invention.

Meanwhile, in the one embodiment disclosed herein, the terminal body 105 and the lower cap 106 may be separated from each other. FIG. 6 is a rear perspective view of the mobile terminal in a case-detached state in accordance with the one exemplary embodiment of the present invention, FIG. 7 is a front perspective view of the mobile terminal in a separated state of the first member in accordance with the one exemplary embodiment of the present invention, and FIG. 8 is a disassembled perspective view of the mobile terminal in accordance with the one exemplary embodiment of the present invention. In this instance, FIG. 7 illustrates a case where the first member 106a is made of a metal. If the first member 106a is made of a non-metal, a clip member 109 to be explained later is not required. That is, the first member 106a is electrically connected to the connecting portion 106c via the clip member 109.

Figure 10A:
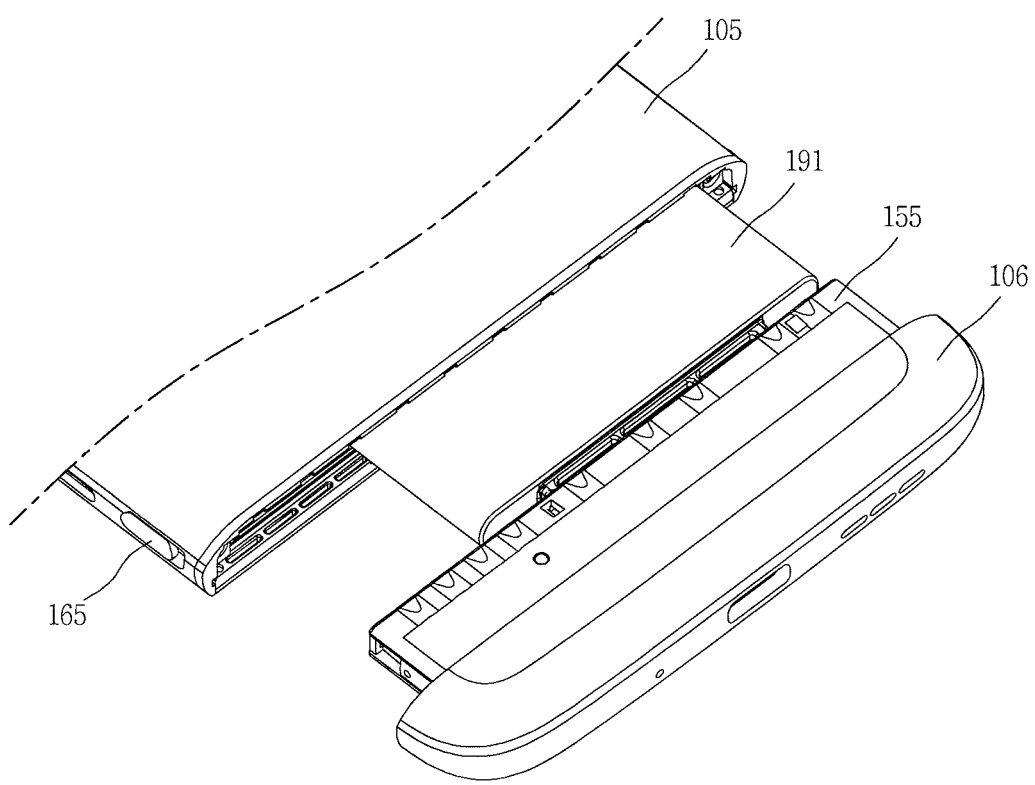
FIG. 10A is a view illustrating a state where a lower end cap is separated from a terminal body in accordance with one exemplary embodiment of the present invention.
Figure 10B:
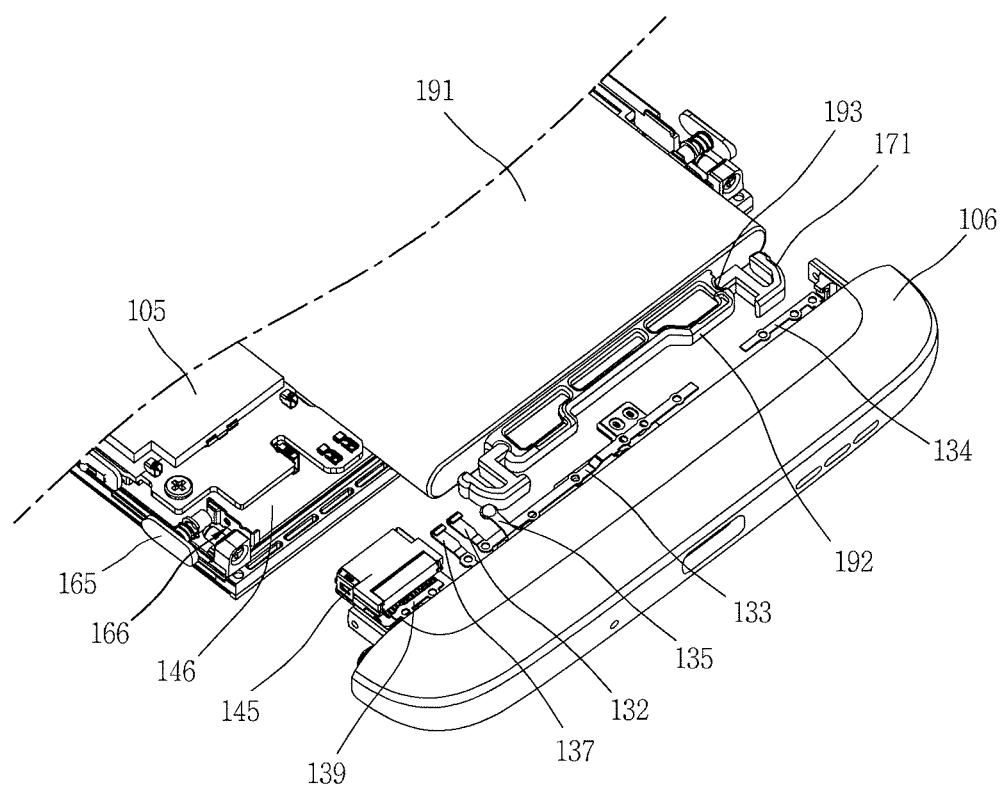
FIG. 10B is a perspective view in a removed state of a case and a bracket from FIG. 10A.

Also, FIG. 10A is a view illustrating a state where the lower end cap is separated from the terminal body in accordance with the one exemplary embodiment of the present invention, and FIG. 10B is a perspective view in a removed state of a case and a bracket from FIG. 10A.

Hereinafter, description will be given with reference to FIGS. 6, 7, 8, 10A and 10B.

The lower cap 106 is provided with a connector 145 by which the sub printed circuit board 108 is connected to the main printed circuit board 181 in the first state, and the terminal body 105 is provided with a contact terminal 146 connected to the connector 145. In this instance, the feeder extending portions 133, 138, the dividing member 135 and the connector 145 are separated from the terminal body 105 along with the lower cap 106 in the second state.

Also, in the one embodiment disclosed herein, since the lower cap 106 is detachable from the terminal body 105, if a module 188 (e.g., see FIGS. 5A and 5B) is disposed in the lower cap 106, the module 188 is also be detachable. That is, if the lower cap 106 is provided in plurality with various modules 188 performing specific functions, respectively, a different type of module 188 can be mounted every time of substituting the lower cap 106. Examples of such modules 188 may include an antenna, a battery module, a finger scan module, and a health care-associated module such as a heartbeat sensor and the like.

The first and second antennas 131 and 136 may also implement different frequency bands according to the lower cap 106. By replacing the lower caps 106 with antennas which implement different frequency bands, the single mobile terminal 100 can be used in various countries or regions. That is, different frequency bands are used depending on countries or regions. If the plurality of lower caps 106 having respective antennas which support different frequency bands to be used in various countries or regions are fabricated, wireless communication for mobile communication can be performed by using the mobile terminal 100 directly in a specific region merely by replacing the lower cap 106 having an antenna supporting a frequency band which is required in the corresponding region.

The mobile terminal according to the one embodiment disclosed herein includes buttons 165 that are exposed to the outside of the terminal body 105 to selectively fix the lower cap 106. The lower cap 106 may be attached or detached in a manner of pressing the buttons 165. Also, according to the one embodiment disclosed herein, locking devices 166 that are disposed in the terminal body 105 and the lower cap 106 to selectively lock the lower cap 106 may further be provided. That is, when the buttons 165 are pressed, the second state that the lower cap 106 is separated from the terminal body 105 can be implemented by the locking devices 166. Stopping portions 192 may be formed on a lower end of the battery 191, as illustrated in FIG. 10B. The stopping portions 192 are provided with recesses 193. When the lower cap 106 is separated from the terminal body 105, the battery 191 is in a state that the stopping portions 192 are stopped at hooks 171 that are formed on the lower cap 106. In this instance, since the hooks 171 are in an accommodated state in the recesses 193, when the lower cap 106 is moved up and down, the battery 191 is separated from the lower cap 106. However, the method of fixing and releasing the battery 191 may not be limited to this. The buttons 165 and the locking devices 166 may obscure the gist of the present invention, so detailed description thereof will be omitted.

As illustrated in FIGS. 6 and 7, the lower cap 106 is provided with a bracket 155. The bracket 155 accommodates therein the plurality of components, such as the sub printed circuit board 108, the connector 145, the first and second feeders 132 and 137, the first and second feeder extending portions 133 and 138, and the first and second stubs 134 and 139.

The first member 106a may be brought into contact with the clip member 109 disposed in the bracket 155, and the clip member 109 may be earthed with the ground, thereby improving the performance of the antenna.

The present invention can be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the controller 180 of the terminal. Therefore, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal, comprising:
    a terminal body having a front surface, a rear surface, and side surfaces extending from end portions of the rear surface toward the front surface, the terminal body being made of a metal;
    a lower cap detachably coupled to a lower end of the terminal body and externally exposed to operate as a radiator of an antenna apparatus;
    a non-metal member interposed between the terminal body and the lower cap and forming a slot by spacing the terminal body and the lower cap apart from each other; and
    a dividing member crossing the non-metal member, and dividing an area where the terminal body and the lower cap are electrically connected and generate an electric field, the dividing member dividing the slot into a first slot and a second slot,
    wherein the antenna apparatus comprises:
        a first antenna generating an electric field by the first slot, the first slot having one side open and another side closed by the dividing member such that the first antenna resonates at a first frequency band; and
        a second antenna generating an electric field by the second slot, the second slot having one side open and another side closed by the dividing member such that the second antenna resonates at a second frequency band different from the first frequency band, and
    wherein the first antenna and the second antenna comprise a first feeder and a second feeder, respectively, connected to a main printed circuit board provided in the terminal body and generating the electric fields on the first slot and the second slot, respectively, and
    wherein the lower cap comprises:
        a first member exposed to the front surface of the terminal body;
        a second member exposed to the rear surface of the terminal body; and
        a connecting portion connecting end portions of the first member and the second member to each other,
    wherein the second member and the connecting portion are made of a metal.

2. The mobile terminal of claim 1, wherein the first member is made of a metal or a non-metal.

3. The mobile terminal of claim 2, wherein the lower cap is configured in a first state to be coupled to the terminal body, and in a second state to be separated from the terminal body.

4. The mobile terminal of claim 3, wherein the first feeder and the second feeder are connected to an inner side of the first member or the second member.

5. The mobile terminal of claim 4, wherein at least one of the first feeder and the second feeder is provided with a feeder extending portion disposed at a position overlapped by the non-metal member.

6. The mobile terminal of claim 5, wherein the feeder extending portion is located at the first slot or the second slot.

7. The mobile terminal of claim 5, wherein the lower cap is provided with a sub printed circuit board and a connector connected to the sub printed circuit board, and
    wherein the connector is configured to connect to a contact terminal of the terminal body in order to connect the sub printed circuit board to the main printed circuit board.

8. The mobile terminal of claim 7, wherein the feeder extending portion, the dividing member, the connector and the lower cap are separated from the terminal body in the second state.

9. The mobile terminal of claim 8, wherein the lower cap is provided with a bracket configured to be inserted within the terminal body, and
    wherein the bracket accommodates the feeder extending portion, the dividing member and the connector.

10. The mobile terminal of claim 4, further comprising a first stub disposed at the first slot, and comprising one side connected to the lower cap and another side forming an open end,
    wherein the first stub is configured to implement a first resonant frequency of the first frequency band.

11. The mobile terminal of claim 4, further comprising a second stub disposed on the second slot, and having one side connected to the lower cap and another side forming an open end,
    wherein the second stub is configured to implement a second resonant frequency of the second frequency band.

12. The mobile terminal of claim 2, wherein the first member, when being made of metal, is electrically connected to the connecting portion via a clip member.

13. The mobile terminal of claim 1, wherein the dividing member is comprised of a metal strip with a predetermined area or is comprised of a plurality of fine cables.

14. The mobile terminal of claim 1, wherein the terminal body comprises an intermediate frame made of a metal, and wherein an electric field is generated between the intermediate frame and the lower cap.

15. The mobile terminal of claim 1, wherein a length of the first slot extending from the dividing member to a first opening at the open side of the first slot is ¼ of a wavelength (λ) corresponding to a center frequency of the first frequency band.

16. The mobile terminal of claim 1, wherein a length of the second slot extending from the dividing member to a second opening at the open side of the second slot is ¼ of a wavelength (λ) corresponding to a center frequency of the second frequency band.

17. The mobile terminal of claim 1, further comprising at least one switch having one side connected to the terminal body and another side connected to the lower cap.

18. A mobile terminal, comprising:
  a terminal body having a front surface, a rear surface, and side surfaces extending from end portions of the rear surface toward the front surface, the terminal body being made of a metal;
  a lower cap detachably coupled to a lower end of the terminal body and externally exposed to operate as a radiator of an antenna apparatus;
  a non-metal member interposed between the terminal body and the lower cap and forming a slot by spacing the terminal body and the lower cap apart from each other; and
  a dividing member crossing the non-metal member, and dividing an area where the terminal body and the lower cap are electrically connected and generate an electric field, the dividing member dividing the slot into a first slot and a second slot,
  wherein the antenna apparatus comprises:
    a first antenna generating an electric field by the first slot, the first slot having one side open and another side closed by the dividing member such that the first antenna resonates at a first frequency band; and
    a second antenna generating an electric field by the second slot, the second slot having one side open and another side closed by the dividing member such that the second antenna resonates at a second frequency band different from the first frequency band, and
  wherein the first antenna and the second antenna comprise a first feeder and a second feeder, respectively, connected to a main printed circuit board provided in the terminal body and generating the electric fields on the first slot and the second slot, respectively.

19. The mobile terminal of claim 18, wherein a length of the first slot extending from the dividing member to a first opening at the open side of the first slot is ¼ of a wavelength (λ) corresponding to a center frequency of the first frequency band, and
  wherein a length of the second slot extending from the dividing member to a second opening at the open side of the second slot is ¼ of a wavelength (λ) corresponding to a center frequency of the second frequency band.

20. The mobile terminal of claim 19, further comprising:
  a first stub disposed at the first slot, and comprising one side connected to the lower cap and another side forming a first open end; and
  a second stub disposed on the second slot, and having one side connected to the lower cap and another side forming a second open end,
  wherein the first stub is configured to implement a first resonant frequency of the first frequency band, and
  wherein the second stub is configured to implement a second resonant frequency of the second frequency band.

* * * * *